United States Patent
Hwang

(10) Patent No.: US 8,488,420 B2
(45) Date of Patent: Jul. 16, 2013

(54) INFORMATION STORAGE MEDIUM, APPARATUS FOR REPRODUCING RECORDINGS, AND METHOD FOR REPRODUCING RECORDINGS

(75) Inventor: Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/227,536

(22) Filed: Sep. 8, 2011

(65) Prior Publication Data

US 2011/0317529 A1    Dec. 29, 2011

Related U.S. Application Data

(63) Continuation of application No. PCT/KR2010/001501, filed on Mar. 10, 2010.

(30) Foreign Application Priority Data

Mar. 10, 2009    (KR) ............... 10-2009-0020407
Mar. 30, 2009    (KR) ............... 10-2009-0026957
Mar. 10, 2010    (KR) ............... 10-2010-0021331

(51) Int. Cl.
     *G11B 7/00*          (2006.01)

(52) U.S. Cl.
     USPC ............. 369/30.1; 369/30.03; 369/94

(58) Field of Classification Search
     USPC ......... 369/30.01, 30.03, 47.34, 47.47, 47.54, 369/283, 94, 30.1, 47.31
See application file for complete search history.

(56) References Cited

U.S. PATENT DOCUMENTS

| | | | | |
|---|---|---|---|---|
| 5,881,032 | A  * | 3/1999 | Ito et al. | 369/30.1 |
| 6,667,939 | B1 * | 12/2003 | Miyamoto | 369/53.21 |
| 2002/0054562 | A1 * | 5/2002 | Satoh et al. | 369/275.3 |

(Continued)

FOREIGN PATENT DOCUMENTS

| | | |
|---|---|---|
| KR | 10-2004-0079944 | 9/2004 |
| KR | 10-2005-0093687 | 9/2005 |

(Continued)

OTHER PUBLICATIONS

Supplementary European Search Report mailed Jul. 17, 2012, issued in counterpart European Patent Application No. 10751019.0; 8 pages.

(Continued)

*Primary Examiner* — Thomas Alunkal
(74) *Attorney, Agent, or Firm* — NSIP Law

(57) ABSTRACT

An information storage medium having a plurality of recording layers is provided. The information storage medium including a physical ADIP address (PAA) which corresponds to an address recorded on the information storage medium. In the case in which an address of a layer i to which a pickup will move corresponds to PAAi, an address of a layer j in which the pickup is currently located corresponds to PAAj, and n corresponds to the number of the recording layers, the PAAi and the PAAj satisfy the equation $$PAAi=PAAj+(7-(i+j))*400000h+000001h(i+j=\text{odd} \text{ and } i,j=0,1,2,\ldots,n-1)$$

in response to the pickup moving from an even layer to an odd layer or from an odd layer to an even layer, and satisfy the equation $$PAAi=PAAj+(i-j)*40\ 00\ 00h(i+j=\text{even and} \ i,j=0,1,2,\ldots,n-1)$$

in response to the pickup moving from an even layer to another even layer or from an odd layer to another odd layer.

5 Claims, 11 Drawing Sheets

U.S. PATENT DOCUMENTS

| | | | |
|---|---|---|---|
| 2005/0030864 A1* | 2/2005 | Tokumoto | 369/53.2 |
| 2006/0098558 A1* | 5/2006 | Kobayashi et al. | 369/275.1 |
| 2007/0070843 A1* | 3/2007 | Kobayashi | 369/47.36 |
| 2008/0130426 A1* | 6/2008 | Kwon | 369/30.1 |
| 2009/0183054 A1* | 7/2009 | Kwon et al. | 714/764 |
| 2009/0303864 A1* | 12/2009 | Nagata et al. | 369/283 |

FOREIGN PATENT DOCUMENTS

| | | |
|---|---|---|
| KR | 10-2008-0016970 | 2/2008 |
| WO | WO-2004/019331 A1 | 3/2004 |
| WO | WO-2006/061736 A1 | 6/2006 |

OTHER PUBLICATIONS

European Examination Report issued on May 3, 2013 in counterpart European Patent Application No. 10 751 019.0 (7 pages, in English).

* cited by examiner

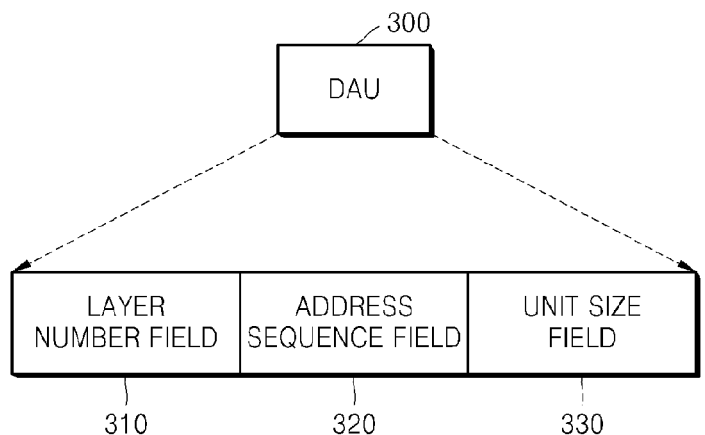

FIG. 5

Physical Adip Address on PTP

| | | | | |
|---|---|---|---|---|
| | L0 | first address →Tracking Direction→ last address | | |
| | | FAA0 PAA0 LAA0 | | |
| Inner Zone | L1 | first address →Tracking Direction→ last address | | Outer Zone |
| | | FAA1 PAA1 LAA1 | | |
| | L2 | first address →Tracking Direction→ last address | | |
| | | FAA2 PAA2 LAA2 | | |
| | L3 | first address →Tracking Direction→ last address | | |
| | | FAU3 PAA3 LAA3 | | |

FIG. 6

Address Unit Number on OTP

| | | | | |
|---|---|---|---|---|
| | L0 | first address →Tracking Direction→ last address | | |
| | | FAU0 DAU0 LAU0 | | |
| Inner Zone | L1 | first address ←Tracking Direction← last address | | Outer Zone |
| | | LAU1 DAU1 FAU1 | | |
| | L2 | first address →Tracking Direction→ last address | | |
| | | FAU2 DAU2 LAU2 | | |
| | L3 | first address ←Tracking Direction← last address | | |
| | | LAU3 DAU3 FAU3 | | |

FIG. 7

Physical Adip Address on OTP

| | | | | |
|---|---|---|---|---|
| | L0 | first address $\xrightarrow{\text{Tracking Direction}}$ last address | | |
| | | FAA0     PAA0     LAA0 | | |
| Inner Zone | L1 | first address $\xleftarrow{\text{Tracking Direction}}$ last address | | Outer Zone |
| | | LAA1     PAA1     FAA1 | | |
| | L2 | first address $\xrightarrow{\text{Tracking Direction}}$ last address | | |
| | | FAA2     PAA2     LAA2 | | |
| | L3 | first address $\xleftarrow{\text{Tracking Direction}}$ last address | | |
| | | LAA3     PAA3     FAA3 | | |

FIG. 8

| | |
|---|---|
| Even(Odd) layer to odd(even) layer | |
| $PAAi = \overline{PAAj + (pow(2,s)-1-(i+j))*pow(2,t)} + C1$   (i+j=odd and i,j = 0,1,2,$\cdots$,n-1) <br> $DAUi = \overline{DAUj + (pow(2,q)-1-(i+j))*pow(2,r)} + C2$   (i+j=odd and i,j = 0,1,2,$\cdots$,n-1) | 810 |
| HC BD | |
| $PAAi = \overline{PAAj + (7-(i+j))*40\ 00\ 00h} + 00\ 00\ 01h$   (i+j=odd and i,j = 0,1,2,$\cdots$,n-1) <br> $DAUi = \overline{DAUj + (7-(i+j))*2\ 00\ 00\ 00h} + 0\ 00\ 00\ 01h$   (i+j=odd and i,j = 0,1,2,$\cdots$,n-1) | 820 |
| Even(Odd) layer to even(odd) layer | |
| $PAAi = PAAj + (i-j)*pow(2,t)$   (i+j=even and i,j = 0,1,2,$\cdots$,n-1) <br> $DAUi = DAUj + (i-j)*pow(2,r)$   (i+j=even and i,j = 0,1,2,$\cdots$,n-1) | 830 |
| HC BD | |
| $PAAi = PAAj + (i-j)*40\ 00\ 00h$   (i+j=even and i,j = 0,1,2,$\cdots$,n-1) <br> $DAUi = DAUj + (i-j)*2\ 00\ 00\ 00h$   (i+j=even and i,j = 0,1,2,$\cdots$,n-1) | 840 |

FIG. 9

| | 910 Layer number | 920 Address Sequence | 930 Repetition Sequence |
|---|---|---|---|
| PAA0 on L0 | AA23..AA21 = 000 | AA20..AA2 | AA1, AA0=00,01,10 From inside to outside |
| PAA1 on L1 | AA23..AA21 = 001 | $\overline{AA20}..\overline{AA2}$ | AA1, AA0=00,01,10 From outside to inside |
| PAA2 on L2 | AA23..AA21 = 010 | AA20..AA2 | AA1, AA0=00,01,10 From inside to outside |
| PAA3 on L3 | AA23..AA21 = 011 | $\overline{AA20}..\overline{AA2}$ | AA1, AA0=00,01,10 From outside to inside |

FIG. 10

| | 1010 Layer number | 1020 Address Sequence | 1030 Unit Size |
|---|---|---|---|
| DAU0 on L0 | AU27..AU24 = 0000 | AU23..AU1 | AU0=0 |
| DAU1 on L1 | AU27..AU24 = 0001 | $\overline{AU23}..\overline{AU1}$ | AU0=0 |
| DAU2 on L2 | AU27..AU24 = 0010 | AU23..AU1 | AU0=0 |
| DAU3 on L3 | AU27..AU24 = 0011 | $\overline{AU23}..\overline{AU1}$ | AU0=0 |

FIG. 11

| | Layer number /1110 | Sequence number /1120 | Intra_RUB number /1130 |
|---|---|---|---|
| PAA0 on L0 | AA24..AA22 = 000 | AA21..AA2 | AA1, AA0=00,01,10 From inside to outside |
| PAA1 on L1 | AA24..AA22 = 001 | $\overline{AA21..AA2}$ | AA1, AA0=00,01,10 From outside to inside |
| PAA2 on L2 | AA24..AA22 = 010 | AA21..AA2 | AA1, AA0=00,01,10 From inside to outside |
| PAA3 on L3 | AA24..AA22 = 011 | $\overline{AA21..AA2}$ | AA1, AA0=00,01,10 From outside to inside |

FIG. 12A

Even(odd) layer to odd(even) layer

| PAA1 <=> PAA0 | PAA1 = $\overline{PAA0 + 1\ 80\ 00\ 01h}$ | PAA0 = $\overline{PAA1 + 1\ 80\ 00\ 01h}$ |
|---|---|---|
| PAA2 <-> PAA1 | PAA2 = $\overline{PAA1 + 1\ 00\ 00\ 01h}$ | PAA1 = $\overline{PAA2 + 1\ 00\ 00\ 01h}$ |
| PAA3 <=> PAA2 | PAA3 = $\overline{PAA2 + 0\ 80\ 00\ 01h}$ | PAA2 = $\overline{PAA3 + 0\ 80\ 00\ 01h}$ |
| PAA3 <=> PAA0 | PAA3 = $\overline{PAA0 + 1\ 00\ 00\ 01h}$ | PAA0 = $\overline{PAA3 + 1\ 00\ 00\ 01h}$ |
| In generalized formula : PAAi = $\overline{PAAj + (7-(i+j))*40\ 00\ 00h + 00\ 00\ 01h}$ (i+j=odd and i,j = 0,1,2,···,n-1) | | |

FIG. 12B

Even(odd) layer to even(odd) layer

| PAA2 <=> PAA0 | PAA2 = PAA0 + 0 80 00 00h | PAA0 = PAA2   0 80 00 00h |
|---|---|---|
| PAA3 <=> PAA1 | PAA3 = PAA1 + 0 80 00 00h | PAA1 = PAA3   0 80 00 00h |
| In generalized formula : PAAi = PAAj + (i−j)*40 00 00h (i+j=even and i,j=0,1,2,···,n−1) | | |

FIG. 13

| | L0 | first address | | last address | |
|---|---|---|---|---|---|
| Inner Zone | | FAA0 | PAA0 | LAA0 | Outer Zone |
| | L1 | last address | | first address | |
| | | LAA1 | PAA1 | FAA1 | |
| | L2 | first address | | last address | |
| | | FAA2 | PAA2 | LAA2 | |
| | L3 | last address | | first address | |
| | | LAA3 | PAA3 | FAA3 | |

FAA0 = 02 00 00h for both 32GB/Layer and 33.4GB/Layer

FIG. 14

Even(odd) layer to odd(even) layer

| LAA1 <=> FAA0 | LAA1 = $\overline{\text{FAA0} + 1\ 80\ 00\ 01h}$ | FAA0 = $\overline{\text{LAA1} + 1\ 80\ 00\ 01h}$ |
|---|---|---|
| FAA2 <=> LAA1 | FAA2 = $\overline{\text{LAA1} + 1\ 00\ 00\ 01h}$ | LAA1 = $\overline{\text{FAA2} + 1\ 00\ 00\ 01h}$ |
| LAA3 <=> FAA2 | LAA3 = $\overline{\text{FAA2} + 0\ 80\ 00\ 01h}$ | FAA2 = $\overline{\text{LAA3} + 0\ 80\ 00\ 01h}$ |
| LAA0 <=> FAA1 | LAA0 = $\overline{\text{FAA1} + 1\ 80\ 00\ 01h}$ | FAA1 = $\overline{\text{LAA0} + 1\ 80\ 00\ 01h}$ |
| FAA1 <=> LAA2 | FAA1 = $\overline{\text{LAA2} + 1\ 00\ 00\ 01h}$ | LAA2 = $\overline{\text{FAA1} + 1\ 00\ 00\ 01h}$ |
| LAA2 <=> FAA3 | LAA2 = $\overline{\text{FAA3} + 0\ 80\ 00\ 01h}$ | FAA3 = $\overline{\text{LAA2} + 0\ 80\ 00\ 01h}$ |

FIG. 15

| | Layer number /1510 | Address Sequence /1520 | Unit Size field /1530 |
|---|---|---|---|
| DAU0 on L0 | AU27..AU25 = 000 | AU24..AU1 | AU0=0 |
| DAU1 on L1 | AU27..AU25 = 001 | $\overline{AU24..AU1}$ | AU0=0 |
| DAU2 on L2 | AU27..AU25 = 010 | AU24..AU1 | AU0=0 |
| DAU3 on L3 | AU27..AU25 = 011 | $\overline{AU24..AU1}$ | AU0=0 |

FIG. 16A

Even(odd) layer to odd(even) layer

| DAU1 <=> DAU0 | DAU1 = $\overline{DAU0 + C\ 00\ 01h}$ | DAU0 = $\overline{DAU1 + C\ 00\ 01h}$ |
|---|---|---|
| DAU2 <=> DAU1 | DAU2 = $\overline{DAU1 + 8\ 00\ 01h}$ | DAU1 = $\overline{DAU2 + 8\ 00\ 01h}$ |
| DAU3 <=> DAU2 | DAU3 = $\overline{DAU2 + 4\ 00\ 01h}$ | DAU2 = $\overline{DAU3 + 4\ 00\ 01h}$ |
| DAU3 <=> DAU0 | DAU3 = $\overline{DAU0 + 8\ 00\ 01h}$ | DAU0 = $\overline{DAU3 + 8\ 00\ 01h}$ |

FIG. 16B

Even(odd) layer to odd(even) layer

| DAU2 <=> DAU0 | DAU2 = DAU0 + 4 00 00h | DAU0 = DAU2 4 000000h |
|---|---|---|
| DAU3 <=> DAU1 | DAU3 = DAU1 + 4 00 00h | DAU1 = DAU3 4 000000h |

FIG. 17

Even(odd) layer to odd(even) layer

| LAU1 <=> FAU0 | LAU1 = $\overline{FAU0 + C\ 00\ 01h}$ | FAU0 = $\overline{LAU1 + C\ 00\ 01h}$ |
|---|---|---|
| FAU2 <=> LAU1 | FAU2 = $\overline{LAU1 + 8\ 00\ 01h}$ | LAU1 = $\overline{FAU2 + 8\ 00\ 01h}$ |
| LAU3 <=> FAU2 | LAU3 = $\overline{FAU2 + 4\ 00\ 01h}$ | FAU2 = $\overline{LAU3 + 4\ 00\ 01h}$ |
| LAU0 <=> FAU1 | LAU0 = $\overline{FAU1 + C\ 00\ 01h}$ | FAU1 = $\overline{LAU0 + C\ 00\ 01h}$ |
| FAU1 <=> LAU2 | FAU1 = $\overline{LAU2 + 8\ 00\ 01h}$ | LAU2 = $\overline{FAU1 + 8\ 00\ 01h}$ |
| LAU2 <=> FAU3 | LAU2 = $\overline{FAU3 + 4\ 00\ 01h}$ | FAU3 = $\overline{LAU2 + 4\ 00\ 01h}$ |

FIG. 18

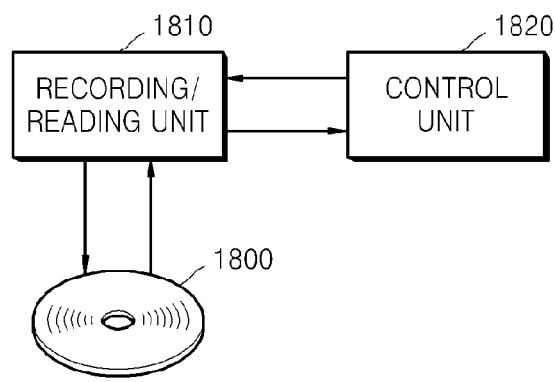

INFORMATION STORAGE MEDIUM, APPARATUS FOR REPRODUCING RECORDINGS, AND METHOD FOR REPRODUCING RECORDINGS

CROSS-REFERENCE TO RELATED APPLICATION(S)

This application is a continuation application under 35 U.S.C. §§120 and 365(c) of PCT Application No. PCT/KR2010/001501 filed on Mar. 10, 2010, which claims the benefit under 35 U.S.C. §119(a) of Korean Patent Application Nos. 10-2009-0020407 filed on Mar. 10, 2009, 10-2009-0026957 filed on Mar. 30, 2009 and 10-2010-0021331 filed on Mar. 10, 2010, in the Korean Intellectual Property Office, the entire disclosures of which are incorporated herein by reference for all purposes.

BACKGROUND

1. Field

The following description relates to an information storage medium, an apparatus for reproducing recordings, and a method for reproducing recordings.

2. Description of Related Art

Various methods such as a high density scheme, a multi-layer scheme, or the like have been devised to implement a high capacity information storage medium (or data transmission through wired or wireless networks). Generally, in the information storage medium, a high capacity is accomplished based on a combination of both a high density per layer and multilayers.

FIG. 1 illustrates an example of a three layer information storage medium 100.

Referring to FIG. 1, the three layer information storage medium 100 includes a first recording layer 110, a second recording layer 120, and a third recording layer 130. Generally, a pickup records or reproduces data in each recording layer along a tracking direction. In response to the pickup moving from a current recording layer to another recording layer, an interlayer movement is performed. As illustrated in FIG. 1, during the interlayer movement, a pickup 140 moves from one recording layer to another recording layer within a same radius of each of the recording layers. For example, the pickup 140 moves from the first recording layer 110 to the second recording layer 120. In another example, the pickup 140 moves from the first recording layer 110 to the third recording layer 130. In this manner, because the pickup 140 moves, theoretically, between two recording layers within the same radius during the interlayer movement, an address of a recording layer to which the pickup 140 moves correspond to an address within the same radius of the other recording layer. However, as a practical matter, the address may not be correct for various reasons, for example, because of mechanical errors which may occur during the interlayer movement of the pickup 140, eccentricity of the medium 100, or the like. Therefore, there is a need for a method to correctly determine the address of a recording layer. In particular, in an information storage medium that includes multilayers, it is even more necessary to correctly determine the address of a recording layer during an interlayer movement between the multilayers.

SUMMARY

According to an aspect, an information storage medium having a plurality of recording layers is provided. The information storage medium includes a physical ADIP address (PAA) which corresponds to an address recorded on the information storage medium. An address of a layer i to which a pickup will move corresponds to PAAi, an address of a layer j in which the pickup is currently located corresponds to PAAj, and n corresponds to the number of the recording layers, the PAAi and the PAAj satisfy the equation $$PAAi = \overline{PAAj + (7-(i+j))} * 400000h + 000001h (i+j = \text{odd} \text{ and } i,j=0,1,2,\ldots,n-1)$$

in response to the pickup moving from an even layer to an odd layer or from an odd layer to an even layer, and the PAAi and the PAAj satisfy the equation $$PAAi = PAAj + (i-j) * 40\,00\,00h (i+j = \text{even} \text{ and } i,j=0,1,2,\ldots,n-1)$$

in response to the pickup moving from an even layer to another even layer or from an odd layer to another odd layer.

In another aspect, an apparatus for recording data on an information storage medium having a plurality of recording layers is provided. The apparatus includes a pickup configured to radiate a beam or receive the beam to transmit data with respect to the information storage medium having a physical ADIP address (PAA) which corresponds to an address recorded on the information storage medium, and a control unit configured to determine an address to which the pickup will move during an interlayer movement to record data, and control the pickup to record the data. An address of a layer i to which the pickup will move corresponds to PAAi, an address of a layer j in which the pickup is currently located corresponds to PAAj, and n corresponds to the number of the recording layers, and the control unit determines whether the PAAi and the PAAj satisfy the equation $$PAAi = \overline{PAAj + (7-(i+j))} * 400000h + 000001h (i+j = \text{odd} \text{ and } i,j=0,1,2,\ldots,n-1)$$

in response to the pickup moving from an even layer to an odd layer or from an odd layer to an even layer, and whether the PAAi and the PAAj satisfy the equation $$PAAi = PAAj + (i-j) * 40\,00\,00h (i+j = \text{even} \text{ and } i,j=0,1,2,\ldots,n-1)$$

in response to the pickup moving from an even layer to another even layer or from an odd layer to another odd layer.

In another aspect, an apparatus for reproducing data from an information storage medium having a plurality of recording layers is provided. The apparatus includes a pickup configured to radiate a beam or receive the beam to transmit data with respect to the information storage medium having a physical ADIP address (PAA) which corresponds to an address recorded on the information storage medium, and a control unit configured to determine an address to which the pickup will move during an interlayer movement to reproduce data, and control the pickup to read the data. An address of a layer i to which the pickup will move corresponds to PAAi, an address of a layer j in which the pickup is currently located corresponds to PAAj, and n corresponds to the number of the recording layers, and the control unit determines whether the PAAi and the PAAj satisfy the equation $$PAAi = \overline{PAAj + (7-(i+j))} * 400000h + 000001h (i+j = \text{odd} \text{ and } i,j=0,1,2,\ldots,n-1)$$

in response to the pickup moving from an even layer to an odd layer or from an odd layer to an even layer, and whether the PAAi and the PAAj satisfy the equation $$PAAi = PAAj + (i-j) * 40\,00\,00h (i+j = \text{even} \text{ and } i,j=0,1,2,\ldots,n-1)$$

in response to the pickup moving from an even layer to another even layer or from an odd layer to another odd layer.

In another aspect, a method of recording data on an information storage medium having a plurality of recording layers and a physical ADIP address (PAA) which corresponds to an address recorded on the information storage medium is provided. The method includes determining an address to which a pickup will move during an interlayer movement to record data, and recording the data. An address of a layer i to which the pickup will move corresponds to PAAi, an address of a layer j in which the pickup is currently located corresponds to PAAj, and n corresponds to the number of the recording layers, and the determining comprises determining whether the PAAi and the PAAj satisfy the equation $$PAAi = \overline{PAAj + (7-(i+j))*400000h + 000001h}(i+j = \text{odd}$$
$$\text{and } i,j = 0,1,2,\ldots,n-1)$$

in response to the pickup moving from an even layer to an odd layer or from an odd layer to an even layer, and whether the PAAi and the PAAj satisfy the equation $$PAAi = PAAj + (i-j)*40\ 00\ 00h (i+j = \text{even}$$
$$\text{and } i,j = 0,1,2,\ldots,n-1)$$

in response to the pickup moving from an even layer to another even layer or from an odd layer to another odd layer.

In another aspect, a method of reproducing data from an information storage medium having a plurality of recording layers and a physical ADIP address (PAA) which corresponds to an address recorded on the information storage medium is provided. The method includes determining an address to which a pickup will move during an interlayer movement to reproduce data, and reproducing the data. An address of a layer i to which the pickup will move corresponds to PAAi, an address of a layer j in which the pickup is currently located corresponds to PAAj, and n corresponds to the number of the recording layers, and the determining comprises determining whether the PAAi and the PAAj satisfy the equation $$PAAi = \overline{PAAj + (7-(i+j))*400000h + 000001h}(i+j = \text{odd}$$
$$\text{and } i,j = 0,1,2,\ldots,n-1)$$

in response to the pickup moving from an even layer to an odd layer or from an odd layer to an even layer, and whether the PAAi and the PAAj satisfy the equation $$PAAi = PAAj + (i-j)*40\ 00\ 00h (i+j = \text{even}$$
$$\text{and } i,j = 0,1,2,\ldots,n-1)$$

in response to the pickup moving from an even layer to another even layer or from an odd layer to another odd layer.

In another aspect, a device includes a recording unit configured to record data on an information storage medium having a plurality of recording layers, the recording unit includes a pickup configured to radiate a beam or receive the beam to transmit data with respect to the information storage medium having a physical ADIP address (PAA) which corresponds to an address recorded on the information storage medium, and a control unit configured to determine an address to which the pickup will move during an interlayer movement to record data, and control the pickup to record the data. An address of a layer i to which the pickup will move corresponds to PAAi, an address of a layer j in which the pickup is currently located corresponds to PAAj, and n corresponds to the number of the recording layers, and the control unit determines whether the PAAi and the PAAj satisfy the equation $$PAAi = \overline{PAAj + (7-(i+j))*400000h + 000001h}(i+j = \text{odd}$$
$$\text{and } i,j = 0,1,2,\ldots,n-1)$$

in response to the pickup moving from an even layer to an odd layer or from an odd layer to an even layer, and whether the PAAi and the PAAj satisfy the equation $$PAAi = PAAj + (i-j)*40\ 00\ 00h (i+j = \text{even}$$
$$\text{and } i,j = 0,1,2,\ldots,n-1)$$

in response to the pickup moving from an even layer to another even layer or from an odd layer to another odd layer, and layer i is a different layer from layer j.

Other features and aspects may be apparent from the following detailed description, the drawings, and the claims.

BRIEF DESCRIPTION OF THE DRAWINGS

FIG. 3 is a diagram illustrating an example of a data address unit (DAU);

FIG. 4 is a diagram illustrating an example an address unit number in a parallel track path (PTP);

FIG. 5 is a diagram illustrating an example a physical ADIP address in the PTP;

FIG. 6 is a diagram illustrating an example an address unit number in an opposite track path (OTP);

FIG. 7 is a diagram illustrating an example a physical ADIP address in the OTP;

FIG. 8 is a diagram illustrating an example of a method of determining an address during an interlayer movement;

FIG. 9 is a diagram illustrating an example of the PAA of each layer in the case where the PAA includes a layer number field having 3 bits, an address sequence field having 19 bits, and a repetition sequence field having 2 bits, which is repeated three times;

FIG. 10 is a diagram illustrating an example of the DAU of each layer in the case where the DAU includes 28 bits;

FIG. 11 is a diagram illustrating an example of the PAA of each layer in the case where the PAA includes 25 bits;

FIG. 12A is a diagram illustrating an example of an address relation when a pickup moves from an even layer to an odd layer or moves from an odd layer to an even layer, in a format illustrated in FIG. 11;

FIG. 12B is a diagram illustrating an example of an address relation when the pickup moves from an even layer to another even layer or moves from an odd layer to another odd layer;

FIG. 13 is a diagram illustrating an example of relations of a first ADIP address (FAA) and a last ADIP address (LAA) in a high capacity blu-ray disc rewritable & recordable triple layer/quadruple layer (HC BD-RE & R TL/QL) format illustrated in FIG. 11;

FIG. 14 is a diagram illustrating an example of an address relation when the pickup moves from an even layer to an odd layer (or, from an odd layer to an even layer);

FIG. 15 is a diagram illustrating an example of the DAU of each layer in the case where the DAU includes 28 bits;

FIG. 16A is a diagram illustrating an example of an address relation when the pickup moves from an even layer to an odd layer or from an odd layer to an even layer;

FIG. 16B is a diagram illustrating an example of an address relation when the pickup moves from an even layer to another even layer or from an odd layer to another odd layer;

FIG. 17 is a diagram illustrating an example of an address relation when the pickup moves from an even layer to an odd layer or from an odd layer to an even layer;

FIG. 18 is a diagram illustrating an example of a recording/reproducing apparatus;

Figure 1:
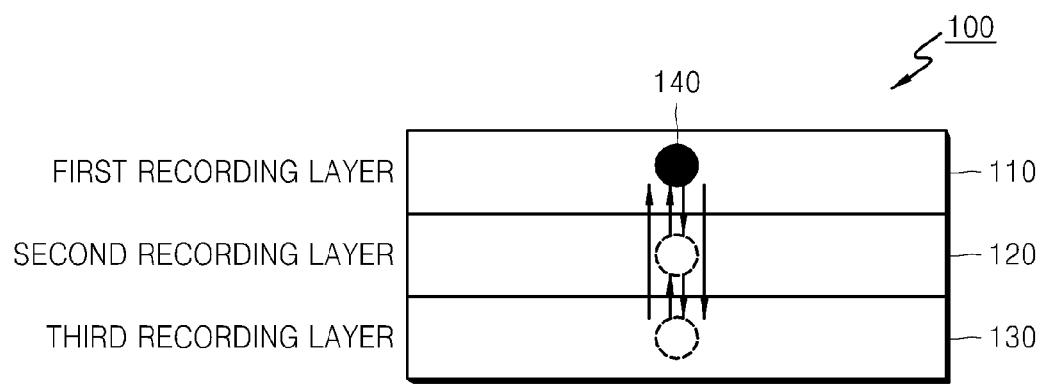
FIG. 1 is a diagram illustrating an example of a three layer information storage medium.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

First, the following terms are defined.

A physical ADIP address (PAA) relates to an address recorded on an information storage medium. ADIP relates to an "address in pre groove".

A first ADIP address (FAA) relates to a first address of the PAA.

A last ADIP address (LAA) relates to a last address of the PAA. The FAA and the LAA also correspond to PAAs.

A data address unit (DAU) relates to an address stored in a recording/reproducing unit block.

A first address unit (FAU) relates to a first address of the DAU.

A last address unit (LAU) relates to a last address of the DAU. The FAU and the LAU also corresponds to DAUs.

Generally, in response to a host transmitting data and a logical address for the data to a recording/reproducing apparatus, the recording/reproducing apparatus searches for a physical address on the information storage medium that corresponds to the transmitted logical address. In addition, the recording/reproducing apparatus stores the DAU in a recording/reproducing unit block for the data and records the data at the physical address. In response to reproducing data, the recording/reproducing apparatus receives a logical address for data to be reproduced from the host, searches for a physical address corresponding to the logical address through the DAU stored inside the recording/reproducing unit block, and then reproduces the corresponding data.

Figure 2:
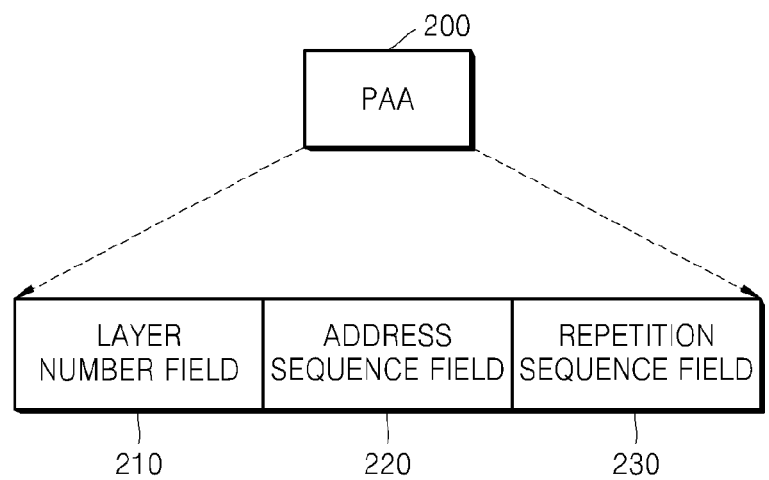
FIG. 2 is a diagram illustrating an example of a physical address in pre groove (ADIP) address (PAA)

FIG. 2 illustrates an example of a PAA 200.

Referring to FIG. 2, the PAA 200 includes a layer number field 210, an address sequence field 220, and a repetition sequence field 230.

FIG. 3 illustrates an example of a DAU 300.

Referring to FIG. 3, the DAU 300 includes a layer number field 310, an address sequence field 320, and a unit size field 330.

The layer number field 210 or 310 relates to a layer corresponding to an address which is indicated by the address sequence field 320. For example, in the case of the information storage medium having n layers (i.e. L0 through Ln−1), in response to a value of the layer number field 210 or 310 corresponding to k, Lk (in this example, k corresponds to an integer 0, 1, 2, . . . , or n−1) indicates a layer.

The address sequence field 220 or 320 relates to an address in a layer corresponding to the layer number field. For example, a unit of the address which corresponds to the address sequence field 220 or 320 may be a sector, a recording/reproducing unit block, or a multiple of the sector.

The repetition sequence field 230 corresponds to a repeated PAA in response to each PAA being repeated. For example, in response to the PAA being repeated three times, a sequence of repeated PAAs may be indicated with 00, 01, and 10 by allocating 2 bits. In response to the PAA not being repeated and being recorded and stored only one time, no bits are allocated to the repetition sequence field 230.

The unit size field 330 corresponds to a field for defining a unit size of the address sequence field 220 or 320 in response to a basic unit for representing an address of the information storage medium being fixed. For example, if the basic unit for representing an address of the information storage medium is a sector, one bit may be allocated to the unit size field 330. A value of the one bit may be fixed to "0" in response to an indication of an address sequence with a unit of two sectors. In response to a unit of the address sequence being substantially the same as the basic unit, no bits are allocated to the unit size field 330.

The layer number field 210 or 310 may constitute the PAA/DAU for indicating a physical address. In a n layer (in this example, n corresponds with an integer which is three or more) information storage medium, the layer number field 210 or 310 may sequentially increase or decrease depending on an increase in a layer number of the information storage medium. In some examples, the address sequence field 220 or 320 may sequentially increase or decrease by a predetermined unit depending on a tracking direction. The address sequence indicates a complement relation with an address sequence of an adjacent PAA/DAU.

A method of arranging addresses in a multilayer disc may be divided into two types. For example, the two types may be a parallel track path (PTP) and an opposite track path (OTP).

The PTP, as illustrated in FIGS. 4 and 5, relates to tracking directions that are substantially the same as each other in all layers of the information storage medium. The OTP, as illustrated in FIGS. 6 and 7 relates to a tracking direction of a layer that is opposite to that of an adjacent layer.

FIG. 4 illustrates an address unit number in the PTP, and FIG. 5 illustrates a physical ADIP address in the PTP. FIG. 6 illustrates an address unit number in the OTP, and FIG. 7 illustrates a physical ADIP address in the OTP.

In both the OTP and the PTP examples, the address sequence may increase or decrease by a predetermined unit based on a tracking direction. However, in the OTP, tracking directions in adjacent layers are opposite to each other. For example, in a direction from an inner circumference to an outer circumference, in response to the address sequence in an odd layer increasing by a predetermined unit, the address sequence in an even layer may decrease by a predetermined unit. In the case of the OTP, a method of determining an address is used in response to a pickup moving from a layer to an adjacent layer. A method of determining an address during an interlayer movement is described below.

FIG. 8 illustrates an example of a method of determining an address during an interlayer movement.

Referring to FIG. 8, in response to a pickup moving from an even layer to an odd layer (or, in response to the pickup moving from the odd layer to the odd layer), a relation 810 between an address of a current layer and an address of a layer to which the pickup will move may be represented by the following equations.

$$PAAi = \overline{PAAj + (pow(2,s)-1-(i+j))*pow(2,t) + C1}(i+j=\text{odd and } i,j=0,1,2,\ldots,n-1)$$

$$DAUi=\overline{DAUj+(pow(2,q)-1-(i+j))*pow(2,r)+C2}(i+j=\text{odd}$$
$$\text{and } i,j=0,1,2,\ldots,n-1)$$

In response to the pickup moving from the even layer to the odd layer (or, in response to the pickup moves from the odd layer to the odd layer), for example, in a case of a high capacity blu-ray (HC BD) disc, a relation 810 between an address of a current layer and an address of a layer to which the pickup moves may be represented by the following equations.

$$PAAi=\overline{PAAj+(7-(i+j))*400000h+000001h}(i+j=\text{odd}$$
$$\text{and } i,j=0,1,2,\ldots,n-1)$$

$$DAUi=\overline{DAUj+(7-(i+j))*2000000h+0000001h}(i+j=\text{odd}$$
$$\text{and } i,j=0,1,2,\ldots,n-1)$$

In this example, the bar over each of the above equations relates to a complement of each result thereof. That is, for example, the PAAi is the complement of "PAAj+(7−(i+j))*40 00 00h+00 00 01h".

In response to the pickup moving from one even layer to another even layer (or, in response to the pickup moving from one odd layer to another odd layer), a relation 830 between an address of a current layer and an address of a layer to which, the pickup will move may be represented by the following equations.

$$PAAi=PAAj+(i-j)*pow(2,t)(i+j=\text{even}$$
$$\text{and } i,j=0,1,2,\ldots,n-1)$$

$$DAUi=DAUj+(i-j)*pow(2,r)(i+j=\text{even}$$
$$\text{and } i,j=0,1,2,\ldots,n-1)$$

In response to the pickup moves from one even layer to another even layer (or, in response to the pickup moves from one odd layer to another odd layer), in a case of the HC BD disc, a relation 840 between an address of a current layer and an address of a layer to which the pickup will move is represented by the following equations.

$$PAAi=PAAj+(i-j)*40\ 00\ 00h(i+j=\text{even}$$
$$\text{and, } i,j=0,1,2,\ldots,n-1)$$

$$DAUi=DAUj+(i-j)*2\ 00\ 00\ 00h(i+j=\text{even}$$
$$\text{and } i,j=0,1,2,\ldots,n-1)$$

In this example, in response to j indicating a current layer in which the pickup is currently located and i indicating a layer to which the pickup will move, an address PAAi after the pickup has moved from the j layer to the i layer may be determined by the above equations using the PAAi.

In the above equations, "s" relates to the number of bits allocated for the layer number field of the PAA. "t" relates to the number of bits allocated for the address sequence field and the repetition sequence field of the PAA. That is, the total number of bits allocated for the PAA relates to the sum of "s" and "t".

"q" relates to the number of bits allocated for the layer number field of the DAU. "r" relates to the number of bits allocated for the address sequence field and the repetition sequence field of the DAU. That is, the number of bits allocated for the DAU is the sum of "q" and "r".

"C1" relates to a constant for adjusting a complement relation of the repetition sequence field. "C2" relates to a constant for adjusting a complement relation of the unit size field. "pow(2,x)" corresponds to x to the power of 2.

An example in which an address relation illustrated in FIG. 8 is derived is described below, with respect to a 4 layers information storage medium of the OTP of FIGS. 6 and 7.

FIG. 9 illustrates an example of the PAA of each layer in the case in which the PAA includes a layer number field 910 having 3 bits, an address sequence field 920 having 19 bits, and a repetition sequence field 930 having 2 bits, which is repeated three times.

Referring to FIG. 9, a value of the layer number field 910 is incremented by one from L0 to L3. A value of the address sequence field 920 has a complement relation with respect to adjacent layers. In addition, values of the repetition sequence field 930 are substantially the same in L0 and L2, are substantially the same in L1 and L3, and are complements of each other in adjacent layers.

The PAAs of FIG. 9 are as follows in response to the pickup moving from one even layer to another even layer (or, in response to the pickup moves from one odd layer to another odd layer).

| PAA2 <=> PAA0 | PAA2 = PAA0 + 40 00 00 h | PAA0 = PAA2 − 40 00 00 h |
| PAA3 <=> PAA1 | PAA3 = PAA1 + 40 00 00 h | PAA1 = PAA3 − 40 00 00 h |

In the above equations, PAA2 has a value in which "40 00 00h" is added to PAA0. Referring to FIG. 9, the PAA0 and the PAA2 are as follows.

The value of the PAA0 becomes "000 AA20 . . . AA2 00 01 10", and the value of the PAA2 becomes "010 AA20 . . . AA2 00 01 10".

In this example, the address sequence number and the repetition sequence number of the PAA2 are substantially the same as the address sequence number and the repetition sequence number of the PAA0, and only the layer number of the PAA2 is different from the layer number of the PAA0. Accordingly, the PAA2 has a value in which a bit value corresponding to the layer number is added to the PAA0.

In this example, the PAA0 includes the layer number "000" having 3 bits, the address sequence number having 19 bits, and the repetition sequence number having 2 bits, and the PAA2 includes the layer number "010" having 3 bits, the address sequence number having 19 bits, and the repetition sequence number having 2 bits.

In other words, the value of the PAA0 corresponds with "000AAAAAAAAAAAAAAAAAAAARR", and the value of the PAA2 corresponds with "010AAAAAAAAAAAAAAAAAAAARR".

"A" indicates the address sequence number having 19 bits, and "R" indicates the repetition sequence number having 2 bits. As stated above, because the address sequence number and the repetition sequence number of the PAA2 are substantially the same as those of the PAA0, the PAA2 has a value in which "01000000 00000000 00000000" is added to the value of the PAA0. Thus, the value of the PAA2 becomes "40 00 00h" when the value of the PAA2 is represented with hexadecimal codes.

Each PAAi may be represented as described above, and in response to this relation being represented as an equation, each PAAi may be represented by the following equation.

$$PAAi=PAAj+(i-j)*20\ 00\ 00h(i+j=\text{even}$$
$$\text{and } i,j=0,1,2,\ldots,n-1)$$

The PAAs of FIG. 9 are as follows in response to the pickup moving from an even layer to an odd layer (or, in response to the pickup moving from an odd layer to an even layer).

| | | |
|---|---|---|
| PAA1 <=> PAA0 | PAA1 = $\overline{PAA0 + C0\ 00\ 01h}$ | PAA0 = $\overline{PAA1 + C0\ 00\ 01h}$ |
| PAA2 <=> PAA1 | PAA2 = $\overline{PAA1 + 80\ 00\ 01h}$ | PAA1 = $\overline{PAA2 + 80\ 00\ 01h}$ |
| PAA3 <=> PAA2 | PAA3 = $\overline{PAA2 + 40\ 00\ 01h}$ | PAA2 = $\overline{PAA3 + 40\ 00\ 01h}$ |
| PAA3 <=> PAA0 | PAA3 = $\overline{PAA0 + 80\ 00\ 01h}$ | PAA0 = $\overline{PAA3 + 80\ 00\ 01h}$ |

In the above equations, PAA1 has a value corresponding to "C0 00 01h" added to PAA0 and then a complement operation is performed on the added value. Referring to FIG. 9, the layer number 910 of the PAA1 has a value corresponding to "1" added to the layer number of the PAA0, the address sequence number 920 of the PAA1 has a value corresponding to a complement of a value of the address sequence number of the PAA0, and the repetition sequence number 930 of the PAA1 has a different order from the order of the repetition sequence number of the PAA0. As one example, the repetition sequence number of the PAA0 is "00 01 10", and the repetition sequence number 930 of the PAA1 is "10 01 00" because the order of the repetition sequence number of the PAA1 is different from the order of the repetition sequence number of the PAA0.

In the above equation, PAA1 is obtained by adding "C0 00 01h" to PAA0 and then complementing the added value, "C" in "C0 00 01h" is a value determined based on a difference between the layer number of the PAA0 and the layer number of the PAA1, and "1" is a value determined based on a difference between the repetition sequence number of the PAA0 and the repetition sequence number of the PAA1.

PAAi is represented as described above, and in response to an equation representing the relation, the PAAi may be represented by the following equation.

$$PAAi = \overline{PAAj + (7-(i+j))*200000h + 000001h}\ (i+j=\text{odd and } i,j=0,1,2,\ldots,n-1)$$

In this equation, a portion "(7−(i+j))*20 00 00h" corresponds to a value determined based on the layer number, and a portion "00 00 01h" corresponds to a value determined based on the repetition sequence number.

FIG. 10 illustrates an example of the DAU of each layer where the DAU includes 28 bits. For example, the 28 bits includes a layer number field 1010 having 4 bits, an address sequence field 1020 having 23 bits, and a unit size field 1030 having 1 bit.

Referring to FIG. 10, a value of the layer number field 1010 is incremented by one for each layer from L0 to L3. A value of the address sequence field 1020 has a complement relation between adjacent layers. In addition, the unit size field 1030 has the same value "0" for each layer.

The DAUs are as follows in response to the pickup moving from one even layer to another even layer (or, in response to the pickup moving from one odd layer to another odd layer).

| | | |
|---|---|---|
| DAU2 <=> DAU0 | DAU2 = DAU0 + 2 00 00 00 h | DAU0 = DAU2 − 2 00 00 00 h |
| DAU3 <=> DAU1 | DAU3 = DAU1 + 2 00 00 00 h | DAU1 = DAU3 − 2 00 00 00 h |

Each DAUi is represented as described above, and in response to this relation being represented as an equation, each DAUi may be represented by the following equation.

$$DAUi = DAUj + (i-j)*1\ 00\ 00\ 00h\ (i+j=\text{even and } i,j=0,1,2,\ldots,n-1)$$

The DAUs are as follows in response to the pickup moving from an even layer to an odd layer (or, in response to the pickup moving from an odd layer to an even layer).

| | | |
|---|---|---|
| DAU1 <=> DAU0 | DAU1 = $\overline{DAU0 + E\ 00\ 0001h}$ | DAU0 = $\overline{DAU1 + E\ 00\ 0001h}$ |
| DAU2 <=> DAU1 | DAU2 = $\overline{DAU1 + C\ 00\ 0001h}$ | DAU1 = $\overline{DAU2 + C\ 00\ 0001h}$ |
| DAU3 <=> DAU2 | DAU3 = $\overline{DAU2 + A\ 00\ 0001h}$ | DAU2 = $\overline{DAU3 + A\ 00\ 0001h}$ |
| DAU3 <=> DAU0 | DAU3 = $\overline{DAU0 + C\ 00\ 0001h}$ | DAU0 = $\overline{DAU3 + C\ 00\ 0001h}$ |

Each DAUi is represented as described above, and in response to this relation being represented as an equation, each DAUi may be represented by the following equation.

$$DAUi = \overline{DAUj + (15-(i+j))1000000h + 0000001h}\ (i+j=\text{odd and } i,j=0,1,2,\ldots,n-1)$$

FIG. 11 illustrates an example of the PAA of each layer in the case where the PAA includes 25 bits. For example, the 25 bits may include a layer number field 1110 having 3 bits, an address sequence field 1120 having 20 bits, and a repetition sequence field 1130 having 2 bits, which is repeated three times. An example of the PAA is illustrated in a high capacity blu-ray disc rewritable & recordable triple layer/quadruple layer (HC BD-RE & R TL/QL).

FIG. 12A illustrates an example of an address relation in response to the pickup moving from an even layer to an odd layer or moves from an odd layer to an even layer, in a format illustrated in FIG. 11.

| | | |
|---|---|---|
| PAA1 <=> PAA0 | PAA1 = $\overline{PAA0 + 1\ 80\ 0001h}$ | PAA0 = $\overline{PAA1 + 1\ 80\ 0001h}$ |
| PAA2 <=> PAA1 | PAA2 = $\overline{PAA1 + 1\ 00\ 0001h}$ | PAA1 = $\overline{PAA2 + 1\ 00\ 0001h}$ |

| | | |
|---|---|---|
| PAA3 <=> PAA2 | PAA3 = $\overline{PAA2 + 0\ 80\ 0001h}$ | PAA2 = $\overline{PAA3 + 0\ 80\ 0001h}$ |
| PAA3 <=> PAA0 | PAA3 = $\overline{PAA0 + 1\ 00\ 0001h}$ | PAA0 = $\overline{PAA3 + 1\ 00\ 0001h}$ |

Each PAAi is represented as described above, and in response to this relation being represented as an equation, each PAAi may be represented by the following equation.
In generalized formula:

$$PAAi = \overline{PAAj + (7-(i+j))*400000h + 000001h}\ (i+j = \text{odd and } i,j = 0,1,2,\ldots,n-1)$$

FIG. 12B illustrates an example of an address relation in response to the pickup moving from an even layer to another even layer or moving from an odd layer to another odd layer.

| | | |
|---|---|---|
| PAA2 <=> PAA0 | PAA2 = PAA0 + 0 80 00 00 h | PAA0 = PAA2 − 0 80 00 00 h |
| PAA3 <=> PAA1 | PAA3 = PAA1 + 0 80 00 00 h | PAA1 = PAA3 − 0 80 00 00 h |

Each PAAi is represented as described above, and in response to this relation being represented as an equation, each PAAi may be represented by the following equation.

$$PAAi = PAAj + (i-j)*40\ 00\ 00h\ (i+j = \text{even and } i,j = 0,1,2,\ldots,n-1)$$

FIG. 13 illustrates an example of relations of the FAA and the LAA in the HC BD-RE & R TL/QL format illustrated in FIG. 11.

FAA0, FAA1, FAA2, FAA3, LAA0, LAA1, LAA2, and LAA3 also relate to PAAs, and thus, the same equation as the above equation may be applied to FAA and LAA.

FIG. 14 illustrates an example of an address relation in response to the pickup moving from an even layer to an odd layer (or, from an odd layer to an even layer).

| | | |
|---|---|---|
| LAA1 <=> FAA0 | LAA1 = $\overline{FAA0 + 1\ 80\ 0001h}$ | FAA0 = $\overline{LAA1 + 1\ 80\ 0001h}$ |
| FAA2 <=> LAA1 | FAA2 = $\overline{LAA1 + 1\ 00\ 0001h}$ | LAA1 = $\overline{FAA2 + 1\ 00\ 0001h}$ |
| LAA3 <=> FAA2 | LAA3 = $\overline{FAA2 + 0\ 80\ 0001h}$ | FAA2 = $\overline{LAA3 + 0\ 80\ 0001h}$ |
| LAA0 <=> FAA1 | LAA0 = $\overline{FAA1 + 1\ 80\ 0001h}$ | FAA1 = $\overline{LAA0 + 1\ 80\ 0001h}$ |
| FAA1 <=> LAA2 | FAA1 = $\overline{LAA2 + 1\ 00\ 0001h}$ | LAA2 = $\overline{FAA1 + 1\ 00\ 0001h}$ |
| LAA2 <=> FAA3 | LAA2 = $\overline{FAA3 + 0\ 80\ 0001h}$ | FAA3 = $\overline{LAA2 + 0\ 80\ 0001h}$ |

FIG. 15 illustrates an example of the DAU of each layer with the DAUs including 28 bits. The 28 bits include a layer number field 1510 having 3 bits, an address sequence field 1520 having 24 bits, and a unit size field 1530 having 1 bit.

Referring to FIG. 15, a value of the layer number field 1510 is incremented by one from L0 to L3. A value of the address sequence field 1520 has a complement relation between adjacent layers. In addition, values of the unit size field 1530 are the same in L0 through L3 with the values being "0".

FIG. 16A illustrates an example of an address relation in response to the pickup moving from an even layer to an odd layer or from an odd layer to an even layer.

| | | |
|---|---|---|
| DAU1 <=> DAU0 | DAU1 = $\overline{DAU0 + C\ 00\ 0001h}$ | DAU0 = $\overline{DAU1 + C\ 00\ 0001h}$ |
| DAU2 <=> DAU1 | DAU2 = $\overline{DAU1 + 8\ 00\ 0001h}$ | DAU1 = $\overline{DAU2 + 8\ 00\ 0001h}$ |
| DAU3 <=> DAU2 | DAU3 = $\overline{DAU2 + 4\ 00\ 0001h}$ | DAU2 = $\overline{DAU3 + 4\ 00\ 0001h}$ |
| DAU3 <=> DAU0 | DAU3 = $\overline{DAU0 + 8\ 00\ 0001h}$ | DAU0 = $\overline{DAU3 + 8\ 00\ 0001h}$ |

Each DAUi is represented as described above, and in response to this relation being represented as an equation, each DAUi may be represented by the following equation.

$$DAUi = \overline{DAUj + (7-(i+j))2000000h + 0000001h}\ (i+j = \text{odd and } i,j = 0,1,2,\ldots,n-1)$$

FIG. 16B illustrates an example of an address relation in response to the pickup moving from an even layer to another even layer or from an odd layer to another odd layer.

| | | |
|---|---|---|
| DAU2 <=> DAU0 | DAU2 = DAU0 + 4 00 00 00 h | DAU0 = DAU2 − 4 00 00 00 h |
| DAU3 <=> DAU1 | DAU3 = DAU1 + 4 00 00 00 h | DAU1 = DAU3 − 4 00 00 00 h |

Each DAUi is represented as described above, and in response to this relation is represented as a generalized equation, each DAUi may be represented by the following equation.

$$DAUi = DAUj + (i-j)*2\ 00\ 00\ 00h\ (i+j=\text{even and } i,j=0,1,2,\ldots,n-1)$$

FAU0, FAU1, FAU2, FAU3, LAU0, LAU1, LAU2, and LAU3 are also special cases of the PAA, and thus, the same equation as the above equation may be applied to FAU and LAU.

FIG. 17 illustrates an example of an address relation in response to the pickup moving from an even layer to an odd layer or from an odd layer to an even layer.

| | | |
|---|---|---|
| LAU1 <=> FAU0 | LAU1 = $\overline{\text{FAU0}}$ + C 00 0001h | FAU0 = $\overline{\text{LAU1}}$ + C 00 0001h |
| FAU2 <=> LAU1 | FAU2 = $\overline{\text{LAU1}}$ + 8 00 0001h | LAU1 = $\overline{\text{FAU2}}$ + 8 00 0001h |
| LAU3 <=> FAU2 | LAU3 = $\overline{\text{FAU2}}$ + 4 00 0001h | FAU2 = $\overline{\text{LAU3}}$ + 4 00 0001h |
| LAU0 <=> FAU1 | LAU0 = $\overline{\text{FAU1}}$ + C 00 0001h | FAU1 = $\overline{\text{LAU0}}$ + C 00 0001h |
| FAU1 <=> LAU2 | FAU1 = $\overline{\text{LAU2}}$ + 8 00 0001h | LAU2 = $\overline{\text{FAU1}}$ + 8 00 0001h |
| LAU2 <=> FAU3 | LAU2 = $\overline{\text{FAU3}}$ + 4 00 0001h | FAU3 = $\overline{\text{LAU2}}$ + 4 00 0001h |

FIG. 18 illustrates an example of a recording/reproducing apparatus.

Referring to FIG. 18, the recording/reproducing apparatus includes a recording/reading unit 1810 and a control unit 1820.

The recording/reading unit 1810 records data on an information storage medium 1800 and reads recorded data from the information storage medium 1800, according to the control unit 1820.

The control unit controls the recording/reading unit 1810 so as to record/read data in/from the information storage medium 1800. The method of determining an address may be applied to both recording and reproducing data. In the case where an interlayer movement is required while searching for an address where data is to be recorded, the address is determined based on the method of determining an address. Data is recorded after the address is determined. In addition, in the case where an interlayer movement is required during searching for an address from where data is to be reproduced, the address is determined based on the method of determining an address. Data is reproduced after the address is determined.

A recording apparatus and a reproducing apparatus may be implemented separately, or the apparatuses may be implemented as one system, as illustrated in FIG. 18.

The information storage medium 1800 includes a plurality of recording layers and a physical ADIP address (PAA) which is an address recorded in the information storage medium.

Figure 19:
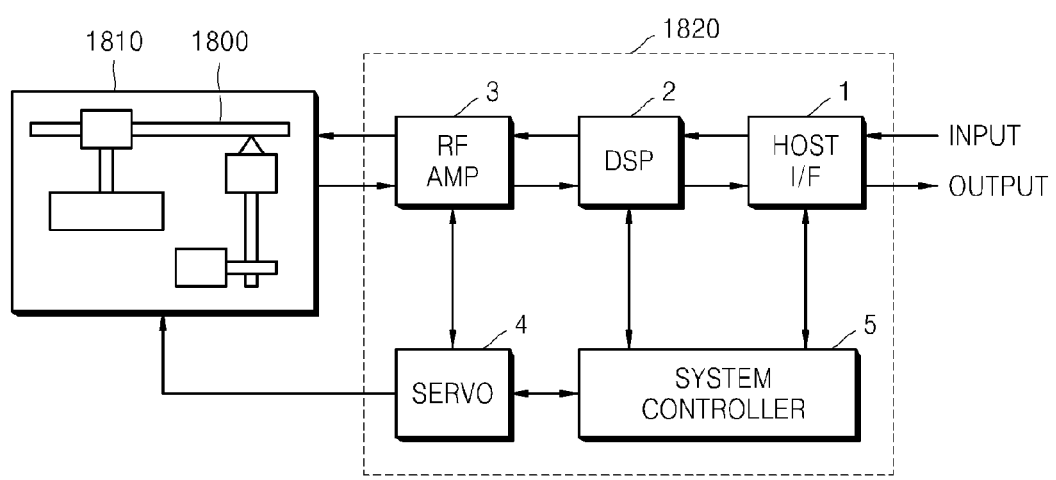
FIG. 19 is a diagram illustrating an example of a drive in which the recording/reproducing apparatus illustrated in FIG. 18 is implemented.

FIG. 19 illustrates an example of a drive in which the recording/reproducing apparatus illustrated in FIG. 18 is implemented.

Referring to FIG. 19, the drive includes a pickup, which corresponds to a recording/reproducing unit 1810. An information storage medium 1800 is installed in the pickup. In addition, the drive includes a control unit 1820 which includes a host interface (I/F) 1, a digital signal processor (DSP) 2, a radio frequency amplifier (RF AMP) 3, a servo 4, and a system controller 5.

During a recording operation, the host I/F 1 receives data to be recorded and a record command from a host (not shown). The system controller 5 performs an initialization prior to recording the data. The DSP 2 receives data to be recorded from the host interface (I/F), adds additional data such as, for example, parity for error correction to the data, and then performs error correction code (ECC) encoding on the data including the parity. Then, the DSP 2 modulates the ECC encoded data by using a predetermined method. The RF AMP 3 changes data output from the DSP 2 into a RF signal. The pickup records the RF signal output from the RF AMP 3 in an information recording medium 1800. The servo 4 receives a command required for servo control from the system controller 5 and servo-controls the pickup.

In another example, the system controller 5 determines an address the pickup will move to during the interlayer movement while recording data, and controls the pickup to record data in a determined address.

In the case where the PAA of a layer i to which the pickup will move is PAAi and the PAA of a layer j in which the pickup is currently located is PAAj, the system controller 5 determines whether the PAAi and the PAAj satisfy the equation $$PAAi = \overline{PAAj + (pow(2,s) - 1 - (i+j))*pow(2,t) + C1}\ (i+j=\text{odd and } i,j=0,1,2,\ldots,n-1)$$

in response to the pickup moving from an even layer to an odd layer or from an odd layer to an even layer. In addition, the system controller 5 determines whether the PAAi and the PAAj satisfy the equation $$PAAi = PAAj + (i-j)*pow(2,t)\ (i+j=\text{even and } i,j=0,1,2,\ldots,n-1)$$

in response to the pickup moving from an even layer to another even layer or from an odd layer to another odd layer.

In the above equations, "s" corresponds with the number of bits allocated for the layer number field of the PAA. "t" corresponds with the number of bits allocated for the address sequence field and the repetition sequence field of the PAA. "C1" corresponds with a constant for adjusting a complement relation of the repetition sequence field. "pow(2,x)" corresponds with x to the power of 2.

In another example, in the case where the information storage medium is a HC BD disc, the system controller 5 determines whether the PAAi and the PAAj satisfy the equation $$PAAi = \overline{PAAj + (7 - (i+j))*400000h + 000001h}\ (i+j=\text{odd and } i,j=0,1,2,\ldots,n-1)$$

in response to the pickup moving from an even layer to an odd layer or from an odd layer to an even layer, and determines whether the PAAi and the PAAj satisfy the equation $$\text{PAA}i=\text{PAA}j+(i-j)*40\ 00\ 00h(i+j=\text{even}$$
$$\text{and}\ i,j=0,1,2,\ldots,n-1)$$

in response to the pickup moving from an even layer to another even layer or from an odd layer to another odd layer.

The above equations may also be applied to the DAU. That is, in the case where the DAU of a layer i to which the pickup will move is DAUi and the DAU of a layer j in which the pickup is currently located is DAUj, the system controller 5 determines whether the DAUi and the DAUj satisfy the equation $$\text{DAU}j=$$
$$\overline{\text{DAU}j}+(pow(2,q)-1-(i+j))pow(2,r)+C2(i+j=\text{odd}$$
$$\text{and}\ i,j=0\ 1,2,\ldots,n-1)$$

in response to the pickup moving from an even layer to an odd layer or from an odd layer to an even layer, and determines whether the DAUi and the DAUj satisfy the equation $$\text{DAU}i=\text{DAU}j+(i-j)*pow(2,r)(i+j=\text{even}$$
$$\text{and}\ i,j=0,1,2,\ldots,n-1)$$

in response to the pickup moving from an even layer to another even layer or from an odd layer to another odd layer.

In the above equations, "q" corresponds with the number of bits allocated for the layer number field of the DAU. "r" corresponds with the number of bits allocated for the address sequence field and the unit size field of the DAU. "C2" corresponds with a constant for adjusting a complement relation of the unit size field. "pow(2,x)" corresponds with x to the power of 2.

In addition, with respect to the DAU, the system controller 5 determines whether the DAUi and the DAUj satisfy the equation $$\text{DAU}i=\overline{\text{DAU}j+(7-(i+j))}*2000000h+0000001h(i+j=\text{odd}$$
$$\text{and}\ i,j=0,1,2,\ldots,n-1)$$

in response to the pickup moving from an even layer to an odd layer or from an odd layer to an even layer, and determines whether the DAUi and the DAUj satisfy the equation $$\text{DAU}i=\text{DAU}j+(i-j)*2\ 00\ 00\ 00h(i+j=\text{even and }i,j=0,1,$$
$$2,\ldots,n-1)$$

in response to the pickup moving from an even layer to another even layer or from an odd layer to another odd layer.

During reproduction, the host I/F 1 receives a reproduction command from the host (not shown). The system controller 5 performs initialization prior to reproduction. The pickup radiates a laser beam to the information storage medium 1800 and outputs an optical signal obtained by receiving the laser beam reflected from the information storage medium 1800. The RF AMP 3 changes the optical signal output from the pickup 1810 into a RF signal, provides modulated data obtained from the RF signal to the DSP 2, and provides a servo signal for controlling, obtained from the RF signal to the servo 4. The DSP 2 demodulates the modulated data and performs ECC error correction, and then outputs data obtained from the ECC error correction of the demodulated data. Meanwhile, the servo 4 receives the servo signal from the RF AMP 3 and a command required for servo control from the system controller 5, and performs servo control for the pickup. The host I/F 1 sends data received from the DSP 2 to the host.

As another example, the system controller 5 determines an address where the pickup will move to during the interlayer movement to reproduce data, and controls the pickup to read data at a determined address.

In response to reproducing, similar to in response to recording, an address is determined by the address relations as stated above.

Figure 20:
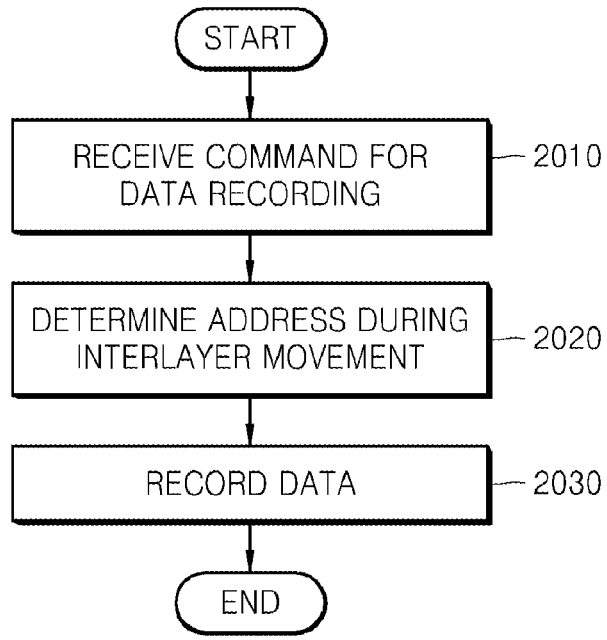
FIG. 20 is a flow chart illustrating an example of a recording method.

FIG. 20 illustrates an example of a recording method.

Referring to FIG. 20, in response to a command for data recording being received (operation 2010), an address is searched for based on the command for data recording. Here, to search for an address in which data is to be recorded, the address is determined in response to an interlayer movement of the pickup occurring (operation 2020). Here, in response to determining an address, as stated above referring to FIG. 19, the system controller 5 determines an address relation by the aforementioned method of determining an address.

In response to the address being determined, data is recorded in the determined address (operation 2030).

Figure 21:
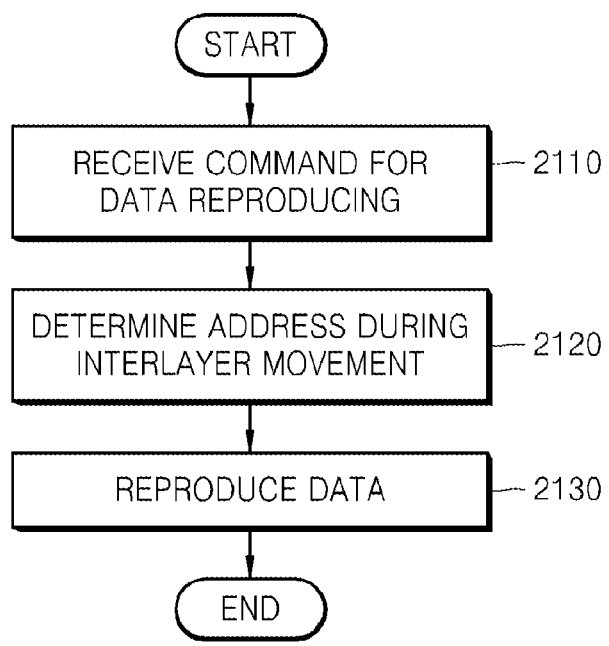
FIG. 21 is a flow chart illustrating an example of a reproducing method.

FIG. 21 illustrates an example of a reproducing method.

Referring to FIG. 21, in response to a command for data reproducing being received (operation 2110), an address is searched for according to the command for data reproducing. Here, to search for an address from which data is to be reproduced, the address is determined in response to an interlayer movement of the pickup occurring (operation 2120). Here, in response to determining an address, the system controller 5 determines an address relation by the aforementioned method of determining an address.

In response to the address being determined, data is reproduced from the determined address (operation 2130).

Devices including the recording/reproducing apparatus include a blu-ray player, a computer with a blu-ray drive and a blu-ray disk duplication device.

An information storage medium having a plurality of recording layers is provided. The information storage medium includes a physical ADIP address (PAA) which is an address recorded on the information storage medium. In the case where an address of a layer i a pickup will move to corresponds to PAAi, an address of a layer j where the pickup is currently located corresponds to PAAj, and n corresponds to the number of the recording layers, the PAAi and the PAAj satisfy the equation $$\text{PAA}i=\overline{\text{PAA}j+(7-(i+j))}400000h+000001h(i+j=\text{odd and}$$
$$i,j=0,1,2,\ldots,n-1)$$

in response to the pickup moves from an even layer to an odd layer or from an odd layer to an even layer, and satisfy the equation $$\text{PAA}i=\text{PAA}j+(i-j)*40\ 00\ 00h(i+j=\text{even}$$
$$\text{and}\ i,j=0,1,2,\ldots,n-1)$$

in response to the pickup moves from an even layer to another even layer or from an odd layer to another odd layer. An address may be efficiently determined during an interlayer movement in a multilayer information storage medium. Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for recording data on an information storage medium having a plurality of recording layers, the apparatus comprising:
   a pickup configured to radiate a beam or receive the beam to transmit data with respect to the information storage medium having a physical ADIP address (PAA) which corresponds to an address recorded on the information storage medium; and
   a control unit configured to determine an address to which the pickup will move during an interlayer movement to record data, and control the pickup to record the data;
   wherein, an address of a layer i to which the pickup will move corresponds to PAAi, an address of a layer j in which the pickup is currently located corresponds to PAAj, and n corresponds to the number of the recording layers, the control unit determines whether the PAAi and the PAAj satisfy the equation $PAA_i = \overline{PAA_j} + (7-(i+j)) * 400000h + 000001h (i+j=\text{odd}$
   $\text{and } i,j=0,1,2,\ldots,n-1)$ in response to the pickup moving from an even layer to an odd layer or from an odd layer to an even layer, and whether the PAAi and the PAAj satisfy the equation $PAA_i = PAA_j + (i-j) * 40\ 00\ 00h (i+j=\text{even}$
   $\text{and } i,j=0,1,2,\ldots, n-1)$ in response to the pickup moving from an even layer to another even layer or from an odd layer to another odd layer.

2. An apparatus for reproducing data from an information storage medium having a plurality of recording layers, the apparatus comprising:
   a pickup configured to radiate a beam or receive the beam to transmit data with respect to the information storage medium having a physical ADIP address (PAA) which corresponds to an address recorded on the information storage medium; and
   a control unit configured to determine an address to which the pickup will move during an interlayer movement to reproduce data, and control the pickup to read the data;
   wherein, an address of a layer i to which the pickup will move corresponds to PAAi, an address of a layer j in which the pickup is currently located corresponds to PAAj, and n corresponds to the number of the recording layers, the control unit determines whether the PAAi and the PAAj satisfy the equation $PAA_i = \overline{PAA_j} + (7-(i+j)) * 400000h + 000001h (i+j=\text{odd}$
   $\text{and } i,j=0,1,2,\ldots,n-1)$ in response to the pickup moving from an even layer to an odd layer or from an odd layer to an even layer, and whether the PAAi and the PAAj satisfy the equation $PAA_i = PAA_j + (i-j) * 40\ 00\ 00h (+j=\text{even}$
   $\text{and } i,j=0,1,2,\ldots,n-1)$ in response to the pickup moving from an even layer to another even layer or from an odd layer to another odd layer.

3. A method of recording data on an information storage medium having a plurality of recording layers and a physical ADIP address (PAA) which corresponds to an address recorded on the information storage medium, the method comprising:
   determining an address to which a pickup will move during an interlayer movement to record data; and
   recording the data,
   wherein an address of a layer i to which the pickup will move corresponds to PAAi, an address of a layer j in which the pickup is currently located corresponds to PAAj, and n corresponds to the number of the recording layers, and the determining comprises determining whether the PAAi and the PAAj satisfy the equation $PAA_i = \overline{PAA_j} + (7-(i+j)) * 400000h + 000001h (i+j=\text{odd}$
   $\text{and } i,j=0,1,2,\ldots,n-1)$ in response to the pickup moving from an even layer to an odd layer or from an odd layer to an even layer, and whether the PAAi and the PAAj satisfy the equation $PAA_i = PAA_j + (i-j) * 40\ 00\ 00h (i+j=\text{even}$
   $\text{and } i,j=0,1,2,\ldots,n-1)$ in response to the pickup moving from an even layer to another even layer or from an odd layer to another odd layer.

4. A method of reproducing data from an information storage medium having a plurality of recording layers and a physical ADIP address (PAA) which corresponds to an address recorded on the information storage medium, the method comprising:
   determining an address to which a pickup will move during an interlayer movement to reproduce data; and
   reproducing the data,
   wherein an address of a layer i to which the pickup will move corresponds to PAAi, an address of a layer j in which the pickup is currently located corresponds to PAAj, and n corresponds to the number of the recording layers, and the determining comprises determining whether the PAAi and the PAAj satisfy the equation $PAA_i = \overline{PAA_j} + (7-(i+j)) * 400000h + 000001h (i+j=\text{odd}$
   $\text{and } i,j=0,1,2,\ldots,n-1)$ in response to the pickup moving from an even layer to an odd layer or from an odd layer to an even layer, and whether the PAAi and the PAAj satisfy the equation $PAA_i = PAA_j + (i-j) * 40\ 00\ 00h (i+j=\text{even}$
   $\text{and } i,j=0,1,2,\ldots,n-1)$ in response to the pickup moving from an even layer to another even layer or from an odd layer to another odd layer.

5. A device comprising:

a recording unit configured to record data on an information storage medium having a plurality of recording layers, the recording unit comprising:

a pickup configured to radiate a beam or receive the beam to transmit data with respect to the information storage medium having a physical ADIP address (PAA) which corresponds to an address recorded on the information storage medium; and a control unit configured to determine an address to which the pickup will move during an interlayer movement to record data, and control the pickup to record the data;

wherein an address of a layer i to which the pickup will move corresponds to PAAi, an address of a layer j in which the pickup is currently located corresponds to PAAj, and n corresponds to the number of the recording layers, and the control unit determines whether the PAAi and the PAAj satisfy the equation $$PAA_i = \overline{PAA_j} + (7-(i+j))*400000h + 000001h (i+j=\text{odd and } i,j=0,1,2,\ldots,n-1)$$

in response to the pickup moving from an even layer to an odd layer or from an odd layer to an even layer, and whether the PAAi and the PAAj satisfy the equation $$PAA_i = PAA_j + (i-j)*40\,00\,00h (i+j=\text{even and } i,j=0,1,2,\ldots,n-1)$$

in response to the pickup moving from an even layer to another even layer or from an odd layer to another odd layer; and layer i is a different layer from layer j.

\* \* \* \* \*